Dec. 2, 1969  J. BERGE  3,481,747
FORMING AND CONVEYING OF CHEESE CURD LOAVES
Filed Dec. 5, 1966  2 Sheets-Sheet 1
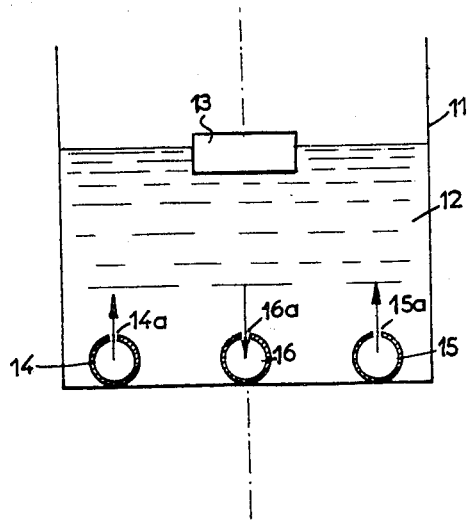
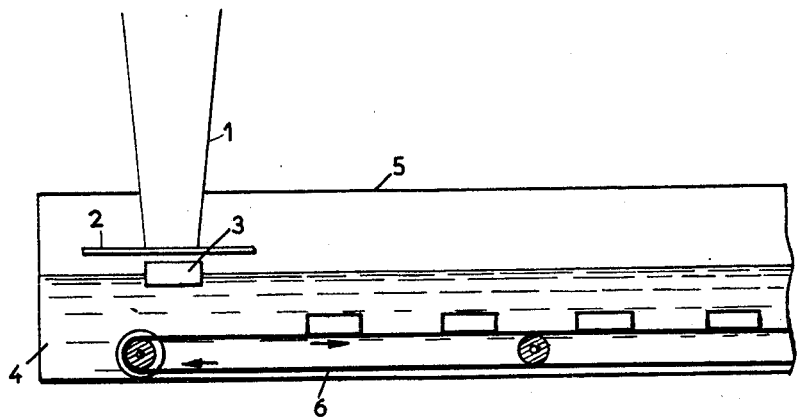
INVENTOR
JACQUES BERGE
BY
ATTORNEYS

INVENTOR
JACQUES BERGE
BY
ATTORNEYS

United States Patent Office 3,481,747
Patented Dec. 2, 1969

3,481,747
FORMING AND CONVEYING OF CHEESE CURD LOAVES
Jacques Berge, Chateau d'Areyt (Hautes-Pyrenees), Prechac, France
Filed Dec. 5, 1966, Ser. No. 599,095
Claims priority, application France, Dec. 7, 1965, 41,238; Nov. 25, 1966, 85,090
Int. Cl. A23c *19/14*
U.S. Cl. 99—115                                    10 Claims

ABSTRACT OF THE DISCLOSURE

Cheese curd is extruded through an orifice and cut into sections to form loaves. The loaves thus obtained are received in a liquid bath and are transported separately within the liquid.

---

The present invention has essentially for its object a method of shaping loaves made of cheese curd and of conveying them to a predetermined place from where said loaves may be further processed to give matured cheeses; it is also concerned with the cheese products obtained according to this method.

This cheese curd may be of any nature and, notably, either of lactic character, that is, derived from a lactic curd, or of rennet character. Its consistency is also immaterial, that is, it may range from "fresh curd" consistency to "pressed curds" consistency, with "soft curds" consistencies as intermediates.

Methods of moulding and handling cheese curds are well known; however, these methods are such that they are not or only very hardly applicable to the manufacture and handling of cheeses or "loaves" from curds of reduced consistency, inasmuch as these loaves have considerable transverse dimensions.

The method according to the invention permits of avoiding these inconveniences and makes it possible to treat any cheese curd, irrespective of the desired shapes and dimensions of the final cheese; moreover, it permits the mechanizaiton and automatization of the cheese making industry which is apparently difficult to achieve by other methods.

This method is characterized in that the cheese curd is extruded through at least one orifice and subsequently cut into sections as it emerges therefrom, the cheese loaves thus obtained being subsequently received in a liquid bath and the loaves conveyed separately within this liquid bath along a predeterminal path.

According to a specific form of embodiment of this method, the aforesaid separate transfer is carried out by creating a current of the liquid constituting said bath; in this case, the liquid constituting said bath is selected to have a greater density than the loaves transferred by said current, so that these loaves can float therein, thus minimizing their tendency to collapse or be deformed. To this end, salted water may be used as a liquid constituting said bath.

The use of a liquid current as a means for transportputs to keep the cheeses in the axial zone of said paths. having any desired configurations, this being facilitated by providing properly disposed liquid inputs and outputs to keep the cheese in the axial zone of said paths.

Of course, a liquid having a higher density than the curd may be used without inasmuch transferring the loaves by means of a liquid current of said bath.

According to a specific feature of the present invention, in the case of a bath in which the loaves can float, said loaves are kept fully immersed in the bath during a predetermined and preferably adjustable time period, by means of an endless belt conveyor, the loaves being urged against the lower face of the lower span of said conveyor (which is at least partially immersed) by Archimedean buoyancy.

According to another feature characterizing this invention the density of the liquid in said bath is selected to have a lower value than that of the cheese curd. Thus, the aforesaid loaves can be brought to the bottom of the bath on the upper span of an endless conveyor belt immersed in the bath so as to reduce the tendency to collapse, to be deformed or to crumble of said loaves, as contrasted with known methods.

According to another feature of this invention the liquid current is imparted a relatively high speed instead of resorting to an extrusion step attended by a reduction in the liquid current speed from the point of extrusion to the place of utilization of the aforesaid loaves, in order to remove within a very short time each extruded cheese from the moulding unit and to increase the relative spacing of the various cheeses. The means operable to this end may be of very different natures: thus, the cross-sectional passage area available for the liquid may be gradually increased; liquid inputs and/or outputs may be provided at various, properly selected locations along the liquid bath; alternately, venturi tubes may be used at the limit between the high-speed bath zone and the low-speed bath zone in order to direct the liquid from the high-speed zone partly to the low-speed zone and partly (due to the acceleration imparted by the venturi tubes) to the upstream portion of this zone, thus effecting a partial recycling of the bathforming liquid in the high-speed zone, said venturi tubes being disposed at a level lower than the bottom of the low-speed zone, due to the provision of a jump provided between the bottom of the high-speed zone and the bottom of the low-speed zone.

According to the present invention, this moulding operation may be carried out in such a manner that the cheeses be extruded directly in contact with, or within the mass of the liquid, or alternately in close vicinity of the liquid, preferably by effecting the extrusion downwards so that they fall directly from a reduced height into the aforesaid bath, but the cheeses may also be extruded upwards within the liquid mass, this last possibility advantageously corresponding to the use of a bath having a higher density than the curd, the shaped loaves being immersed by using an endless belt of the aforesaid type.

In the general case of a bath having a higher density than the curd, the loaves or cheeses can be extracted from the bath according to this invention, by means of a conveyor having one end slightly immersed in the bath and disposed just after the aforesaid endless belt in case the latter were utilized.

According to a further feature characterizing this invention, notably in the case of soft or fresh curds, the liquid of said bath is cooled in order to cool and harden the cheeses as they are shaped; since the addition of electrolytes such as common salt to water reduces its freezing point, in the case of an essentially aqueous medium it will be possible to operate well below 0° C. by using brine at a suitable concentration.

It will be noted that the method of this invention is particularly interesting in the case of fresh and soft curds for these, like all cheese curds, are advantageously moulded at relatively high temperatures in order to improve the quality of the final cheeses, but they could not withstand such moulding conditions involving the crumbling or deformation of the cheeses as they emerge from the mould, under the conventional delivery conditions of cheese moulds, this inconvenience being proportional to the cheese dimensions; now by rapidly cooling the curd by means of a suitable bath these drawbacks are completely removed irrespective of the cheese dimensions.

According to another feature characterizing this invention, the curd is heated immediately before and/or during the moulding operation, for example by using a jacketed member in which a circulation of hot fluid is maintained, this member surrounding the chamber from which the moulding unit is fed.

According to a complementary feature of this invention, in the case of pressed curds, the liquid constituting said bath in which the loaves are transferred is heated; this treatment, generally not applicable to cheeses obtained by moulding fresh or soft curds, produces a marked improvement in the qualities of the final cheese thus obtained.

According to the present invention, the liquid constituting the bath is an aqueous liquid having a pH value consistent with the curd pH, that is, practically equal to the curd pH (for example ranging from 4 to 4.6 in the case of a soft curd), or purposely slightly different from the curd pH, in order to preserve all the qualities of the curd or possibly to impart such or such other desired quality or property thereto; this liquid may advantageously consist of the whey obtained from the milk yielding the curd which is submitted to the present method or any kind of whey, for example, a whey obtained when producing any type of curd from another milk; the pH value may possibly be brought to the desired value by adding an organic or inorganic acid to water; the liquid of said bath may also consist, as already explained hereinabove, of brine; thus, the cheeses may be salted automatically to the desired degree which is adjustable by properly selecting the brine concentration and/or time of immersion in the bath, for example by implementing the means mentioned hereinabove (such as an immersed endless belt).

An apparatus for carrying out the method of this invention will comprise notably on the one hand a unit for moulding fresh, soft or pressed curd, and on the other hand means for separately transporting the loaves or cheeses obtained by moulding in a liquid bath so disposed as to receive directly the loaves delivered fom said moulding unit.

Preferably, the separate transport means of said apparatus will constitute a hydraulic assembly comprising a head for receiving the aforesaid separate loaves, said head being disposed just beneath the extrusion head of the moulding unit, and a vessel or vat for discharging said loaves.

Other features and advantages of the present invention will appear as the following description proceeds.

In the attached drawings given by way of example only:

FIGURE 1 illustrates in longitudinal section a diagrammatic view of an apparatus for carrying out the method of this invention according to a first form of embodiment;

FIGURE 3 illustrates in cross-sectional view a hydraulic channel showing the case of the axial transfer of the cheese loaves.

Figure 2:
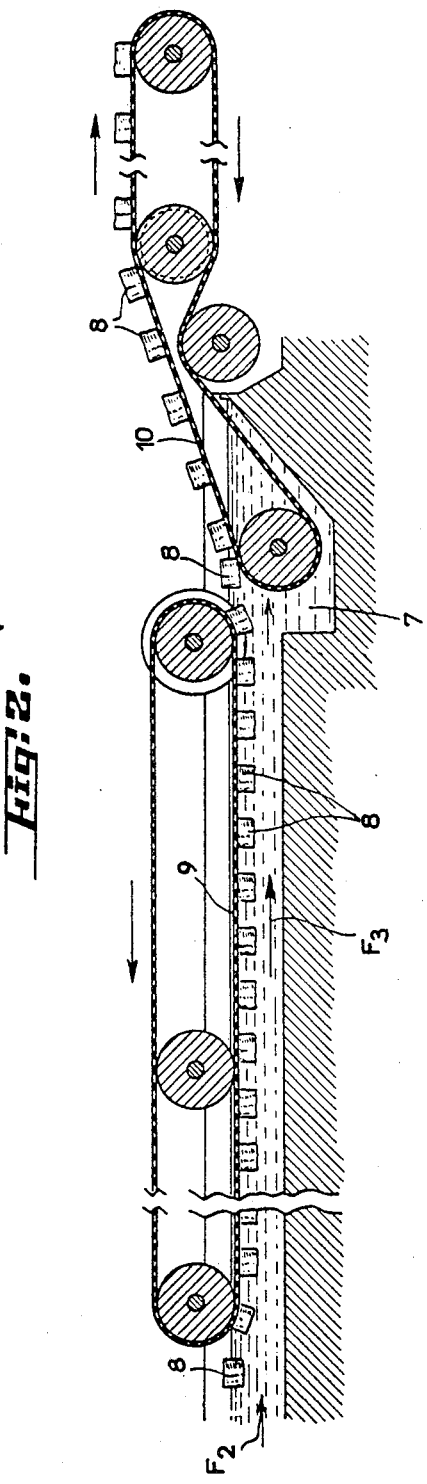
FIGURE 2 illustrates in longitudinal axial section the downstream section of a hydraulic assembly for carrying out the method of this invention according to another form of embodiment.

FIGURE 1 shows in diagrammatic form a moulding unit 1 comprising means 2 for cutting the extrusion sausage delivered from the moulding unit 1 so as to form loaves 3; the liquid 4 of the bath in the hydraulic unit 5 has a lower density than the loaves 3 in this case, whereby these loaves are collected by the upper carrier run of an endless conveyor belt 6 immersed in the bottom of said bath, the function of this belt consisting in directing, within the hydraulic fluid, the previously formed loaves towards the place of utilization, without any risk of collapsing, breaking up or altering the shape of these loaves since they bear on the belt 6 with a force inferior to their actual weight; besides, their fall upon this belt is retarded by the presence of the liquid 4; moreover, in the case notably of soft or fresh curd, the consistency thereof may be improved by providing, according to this invention, means for cooling the liquid constituting the bath 4 (for example by using salted water at a temperature inferior to 0° C.).

The case illustrated in FIGURE 2 corresponds for instance to the production of cheeses to be salted at a predetermined rate and/or biologically sowed by introducing metered quantities of seeds into the liquids; in this case the liquid has a higher density than the cheeses, but the loaves of cheese curd are not allowed to float on the bath surface.

This FIGURE 2 shows the vat in which the liquid current $F_2$ carries along the loaves 8 of cheese curd. A uniform application of brine all over the cheese surface requires that the curds be constantly maintained below the bath surface and that all the loaves remain underwater during the same time period; besides, the immersion time must be easily and accurately adjustable as a function of the bath characteristics and also of the desired properties of the cheese curd. An endless belt 9 keeps the loaves 8 immersed by exerting thereon a vertical pressure, the contact thus produced by the Archimedean buoyancy causing each loaf 8 to adhere to the endless belt 9 and follow its movement of translation (arrow $F_3$). The slow motion $F_2$ of the bath in the same direction has a considerably weaker driving effect and therefore each loaf 8 is carried along at exactly the same speed as the endless belt 9. The loaves 8 are placed under the endless belt 9 by the slow current $F_2$ of the bath. The adjustment of a variable speed transmission associated with the belt driving means corresponds to an adjustment of the total immersion time of the loaves 8. This endless belt 9 is made of porous or perforated material whereby the brine constantly contacts the upper face of each loaf; when the loaves attain the end of the endless belt 9 they are released and again carried along by the slow liquid current; then the loaves are extracted fom the liquid bath by another endless belt 10 from which they are removed by operators or an automatic receiving device; if desired, the loaves 8 delivered by the endless belt 9 can be received by trays or the like immersed by turns into the bath, and in this case the second endless belt 10 is omitted.

FIGURE 3 illustrates a circulation channel 11 containing a liquid 12 having a greater density than the moulded loaf of cheese curd 13 which will thus float on the bath surface; liquid inputs are provided in this bath through orifices such as 14a and 15a formed in pipe lines 14 and 15, and liquid outputs are also provided through outlet orifices 16a formed in an axial pipe line 16; the loaves 3 are thus maintained in an axial position in the channel 1 to avoid any detrimental contact with the walls thereof.

Of course, this invention should not be construed as being limited by the specific forms of embodiment described and illustrated herein which are given by way of example only.

What I claim is:

1. Method of shaping loaves of cheese curd and of conveying them to a given place for further processing, said curd having a consistency ranging from "fresh curd" to "pressed curd" consistency, with "soft curd" consistency as an intermediate comprising the steps of shaping said curd by extrusion, cutting the shaped extruded curd as it emerges on completion of said extrusion, providing a liquid bath below the loaves into which said loaves are directly received, without making contact with any intermediate solid member, said liquid bath forming an hydraulic path extending to the region of said place, that part of said path receiving said loaves being located in the vicinity of the cutting into loaves, the liquid of said liquid bath being selected from the group consisting of water, acidified water, brines and whey, providing an endless conveyor having a moving span immersed in said bath, said loaves being separately conveyed in said liquid bath from said part to said place by said immersed moving span of said endless conveyor against which span they are directed by flow of said bath and maintained owing to the difference between their weight and the buoyancy of said liquid.

2. Method of shaping loaves of cheese curd and of conveying them to a given place for further processing, said curd having a consistency ranging from "fresh curd" to "pressed curd" consistency, with "soft curd" consistency as an intermediate comprising the steps of shaping said curd by extrusion, cutting the shaped extruded curd directly as it emerges on completion of said extrusion, providing a liquid bath below the loaves into which said loaves are directly received, without making any contact with any intermediate solid member, said liquid bath forming an hydraulic path extending to the region of said place, that part of said path receiving said loaves being located in the vicinity of said cutting into loaves, the liquid bath being selected from the group consisting of water, acidified water, brines and whey, said loaves being separately conveyed at the surface of said liquid bath by establishing a current of said liquid in said liquid bath throughout said hydraulic path, using a liquid the density of which is greater than that of said curd and providing auxiliary liquid streams in said liquid bath, along said hydraulic path, to maintan said loaves in the axial zone thereof.

3. Method according to claim 1, wherein said span is the lower span of said endless conveyor, said loaves being caused to be applied on the external face of said lower span by using a liquid whose density is greater than that of said curd.

4. Method according to claim 1, wherein said span is the upper span of said endless conveyor belt, said loaves being caused to rest on the external face of said upper span by using a liquid whose density is lower than that of said curd.

5. Method according to claim 1, wherein a current of said liquid in said liquid bath is established in the same direction as that of the movement of said span.

6. Method according to claim 2, wherein the speed of said current is caused to decrease in progress from said part to said place.

7. Method according to claim 1, wherein said liquid bath is cooled.

8. Method according to claim 2, wherein said auxiliary liquid streams are ascending lateral currents obtained by use of liquid inputs disposed in lateral parts of the bottom of said bath and descending central current derived by liquid outputs disposed in a central zone of the bottom of said bath.

9. Method according to claim 1, wherein said loaves are extracted from said bath, at said place, by the upper span of an inclined endless conveyor whose end facing said first-named endless conveyor is immersed in said bath in the vicinity of the delivering end of the span of said first-named endless conveyor.

10. Method according to claim 1, wherein said loaves are extracted from said bath, at said place, by removable immersed trays.

References Cited

UNITED STATES PATENTS

| 3,120,443 | 2/1964 | Berridge | 99—115 X |
| 3,167,862 | 2/1965 | Czulak | 99—115 |

FOREIGN PATENTS

| 149,202 | 11/1949 | Australia. |
| 689,748 | 6/1964 | Canada. |

A. LOUIS MONACELL, Primary Examiner

D. M. NAFF, Assistant Examiner

PO-1050
(5/69)

UNITED STATES PATENT OFFICE
CERTIFICATE OF CORRECTION

Patent No. 3,481,747  Dated December 2, 1969

Inventor(s) Jacques Berge

It is certified that error appears in the above-identified patent and that said Letters Patent are hereby corrected as shown below:

Column 1, line 43, "mechanizaiton" should read

--mechanization---;

Column 1, line 62, delete "puts to keep the cheeses in the axial zone of said paths." and substitute: ---ing the cheeses permits of directing them along paths---

Column 1, line 65, "cheese" should read ---cheeses---.

SIGNED AND
SEALED
JUN 2 1970

(SEAL)
Attest:

Edward M. Fletcher, Jr.
Attesting Officer

WILLIAM E. SCHUYLER, JR.
Commissioner of Patents